United States Patent
Ijaz et al.

(10) Patent No.: US 10,868,610 B2
(45) Date of Patent: Dec. 15, 2020

(54) COMMUNICATIONS DEVICE, COMMUNICATIONS APPARATUS OPERATING AS A RELAY NODE, INFRASTRUCTURE EQUIPMENT AND METHODS

(71) Applicant: Sony Corporation, Tokyo (JP)

(72) Inventors: Ayesha Ijaz, Weybridge (GB); Atta Ul Quddus, Weybridge (GB); Muhammad Ali Imran, Weybridge (GB); Lei Zhang, Weybridge (GB); Hideji Wakabayashi, Basingstoke (GB); Jussi Tapani Kahtava, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/406,021

(22) Filed: May 8, 2019

(65) Prior Publication Data

US 2019/0268063 A1    Aug. 29, 2019

Related U.S. Application Data

(63) Continuation of application No. 15/311,666, filed as application No. PCT/EP2015/058423 on Apr. 17, 2015, now Pat. No. 10,341,006.

(30) Foreign Application Priority Data

May 27, 2014   (EP) .................................. 14170122

(51) Int. Cl.
*H04W 72/04*   (2009.01)
*H04W 72/14*   (2009.01)
(Continued)

(52) U.S. Cl.
CPC ........ *H04B 7/15507* (2013.01); *H04W 72/04* (2013.01); *H04W 72/0466* (2013.01);
(Continued)

(58) Field of Classification Search
CPC ............... H04W 74/006; H04W 72/04; H04W 72/0446; H04W 74/0833
See application file for complete search history.

(56) References Cited

U.S. PATENT DOCUMENTS 9,474,092 B2 * 10/2016 Zakrzewski .......... H04W 76/11
2013/0287014 A1   10/2013 Yuk et al.
(Continued)

OTHER PUBLICATIONS

International Search Report dated Dec. 18, 2015 in PCT/EP2015/058423 filed Apr. 17, 2015.
(Continued)

Primary Examiner — Raj Jain
(74) Attorney, Agent, or Firm — Xsensus LLP

(57) ABSTRACT

A communications device including a transmitter and a receiver configured to transmit and receive signals representing data to and from an infrastructure equipment of a mobile communications network via a first wireless access interface. The communications device transmits signals via a second wireless access interface to a communications apparatus operating as a relay node, and determines an additional delay caused by the transmission of the signals to the communications apparatus acting as the relay node via the second wireless access interface compared with a time taken which would have been taken to transmit the signals to the infrastructure equipment as if transmitted via the first wireless access interface, and transmits an indication from which the infrastructure equipment can derive the determined additional delay for adjusting the transmission or reception of the synchronized response.

14 Claims, 8 Drawing Sheets

(51) Int. Cl.
  *H04B 7/155* (2006.01)
  *H04W 76/27* (2018.01)
  *H04W 74/08* (2009.01)
  *H04L 1/18* (2006.01)

(52) U.S. Cl.
  CPC .......... *H04W 72/14* (2013.01); *H04W 74/08* (2013.01); *H04W 74/0833* (2013.01); *H04W 76/27* (2018.02); *H04L 1/1812* (2013.01)

(56) References Cited

U.S. PATENT DOCUMENTS

| | | | | |
|---|---|---|---|---|
| 2014/0010173 | A1* | 1/2014 | Zakrzewski | H04W 74/0833 370/329 |
| 2014/0029586 | A1* | 1/2014 | Loehr | H04B 3/36 370/336 |
| 2014/0141779 | A1 | 5/2014 | Yuk et al. | |
| 2014/0226558 | A1 | 8/2014 | Speight et al. | |
| 2016/0174263 | A1* | 6/2016 | Webb | H04W 74/0833 370/329 |
| 2017/0093480 | A1* | 3/2017 | Ijaz | H04W 72/04 |

OTHER PUBLICATIONS

Yang Yang et al., "Relay Technologies for WiMAX and LTE-Advanced Mobile Systems", IEEE Communications Magazine, Oct. 2009, pp. 100-105.

Kanchei Loa et al., "IMT-Advanced Relay Standards", IEEE Communications Magazine, Aug. 2010, pp. 40-48.

3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814, V9.0.0, Technical Report, Mar. 2010, 104 pages.

"System Design Frameworks to Support Type II Relay Operation in LTE-A", Alcatel-Lucent, 3GPP TSG RAN WG1 #58, R1-093355, Aug. 24-28, 2009, pp. 1-11.

"Challenges with Type II Relay Operation", Qualcomm Europe, 3GPP TSG-RAN WG1 #58, R1-093113, Aug. 24-28, 2009, pp. 1-3.

"Type 2 Relay Summary", Alcatel-Lucent, Alcatel-Lucent Shanghai Bell, CHTTL, 3GPP TSG RAN WG1 Meeting #60, R1-100951, Feb. 18-22, 2010, 3 pages.

"Considerations on using type 2 relay for UL transmission", Fujitsu, 3GPP TSG-RAN1 #59bis, R1-100584, Jan. 18-22, 2010, pp. 1-3.

Mikio Iwamura et al., "Relay Technology in LTE-Advanced", NTT DOCOMO Technical Journal, 2010, vol. 12, No. 2, pp. 29-36.

Anxin Li, "A novel type II relay-assisted retransmission scheme for uplink of LTE-advanced system", EURASIP Journal on Advances in Signal Processing, 2013, vol. 2013, No. 1, 2 pages (Abstract only).

Stefania Sesia et al., "LTE—The UMTS Long Term Evolution: From Theory to Practice", Wiley, 2011, 3 pages (Abstract only).

"Updated SID on: Provision of low-cost MTC UEs based on LTE", Vodafone, TSG RAN meeting #57, RP-121441, Sep. 4-7, 2012, 6 pages.

"3rd Generation Partnership Project; Technical Specification Group Radio Access Network; Evolved Universal Terrestrial Radio Access (E-UTRA); LTE coverage enhancements (Release 11)", 3GPP TR 36.824, V11.0.0, Technical Report, Jun. 2012, 18 pages.

"General considerations on coverage enhancements for MTC", Ericsson, ST-Ericsson, 3GPP TSG-RAN WG1 Meeting #71, R1-124887, Nov. 12-16, 2012, 6 pages.

"Coverage improvement techniques for low cost MTC UEs", Sony Europe Ltd., 3GPP TSG RAN WG1 #71, R1-125039, Nov. 12-16, 2012, pp. 1-10.

"Text proposal on Coverage Enhancement for a MTC UE", LG Electronics, 3GPP TSG RAN WG1 #72, R1-130264, Jan. 28-Feb. 1, 2013, 7 pages.

"Coverage Extension for MTC UEs", General Dynamics Broadband UK, 3GPP TSG-RAN1 #71, R1-125204, Nov. 12-16, 2012, 7 pages.

"PDSCH coverage extension for low-cost MTC UEs by power-density boosting", Sony, 3GPP TSG RAN WG1 #72bis, R1-130959, Apr. 15-19, 2013, pp. 1-8.

"PDCCH coverage extension for low-cost MTC UEs by power-density boosting", Sony, 3GPP TSG RAN WG1 #72bis, R1-130960, Apr. 15-19, 2013, pp. 1-7.

"PBCH coverage extension for low-cost MTC UEs by power-density boosting", Sony, 3GPP TSG RAN WG1 #72bis, R1-130958, Apr. 15-19, 2013, pp. 1-6.

"3rd Generation Partnership Project; Technical Specification Group Radio Access Network; Study on provision of low-cost Machine-Type Communications (MTC) User Equipments (UEs) based on LTE (Release 12)" 3GPP TR 36.888, V12.0.0, Technical Report, Jun. 2013, 55 pages.

Erik Dahlman et al., "4G LTE/LTE-Advanced for Mobile Broadband", Elsevier Ltd., ISBN 978-0-12-385489-6, 2011, 7 pages (Chapter summaries only).

* cited by examiner

Example deployement of UEs and operation of an ad hoc relay node

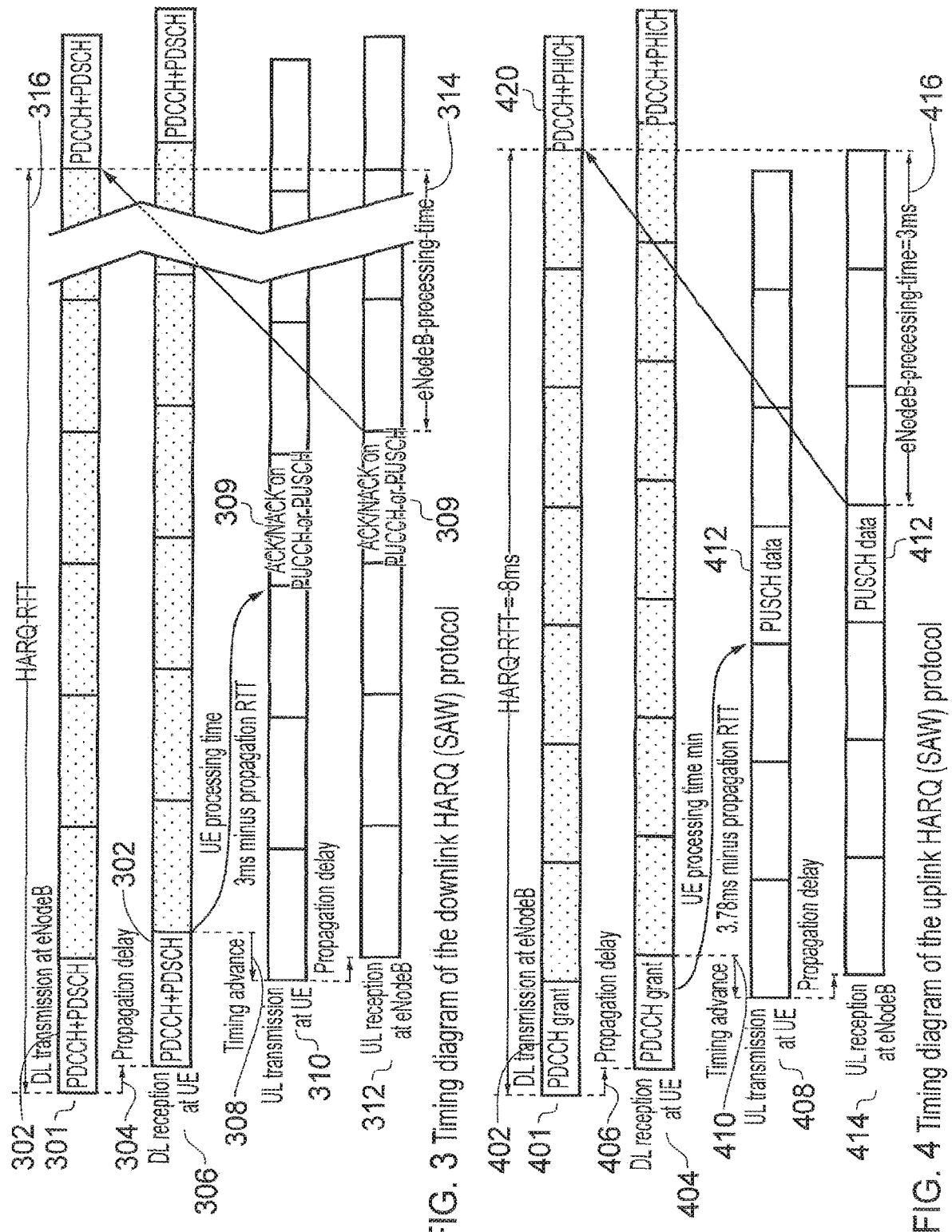

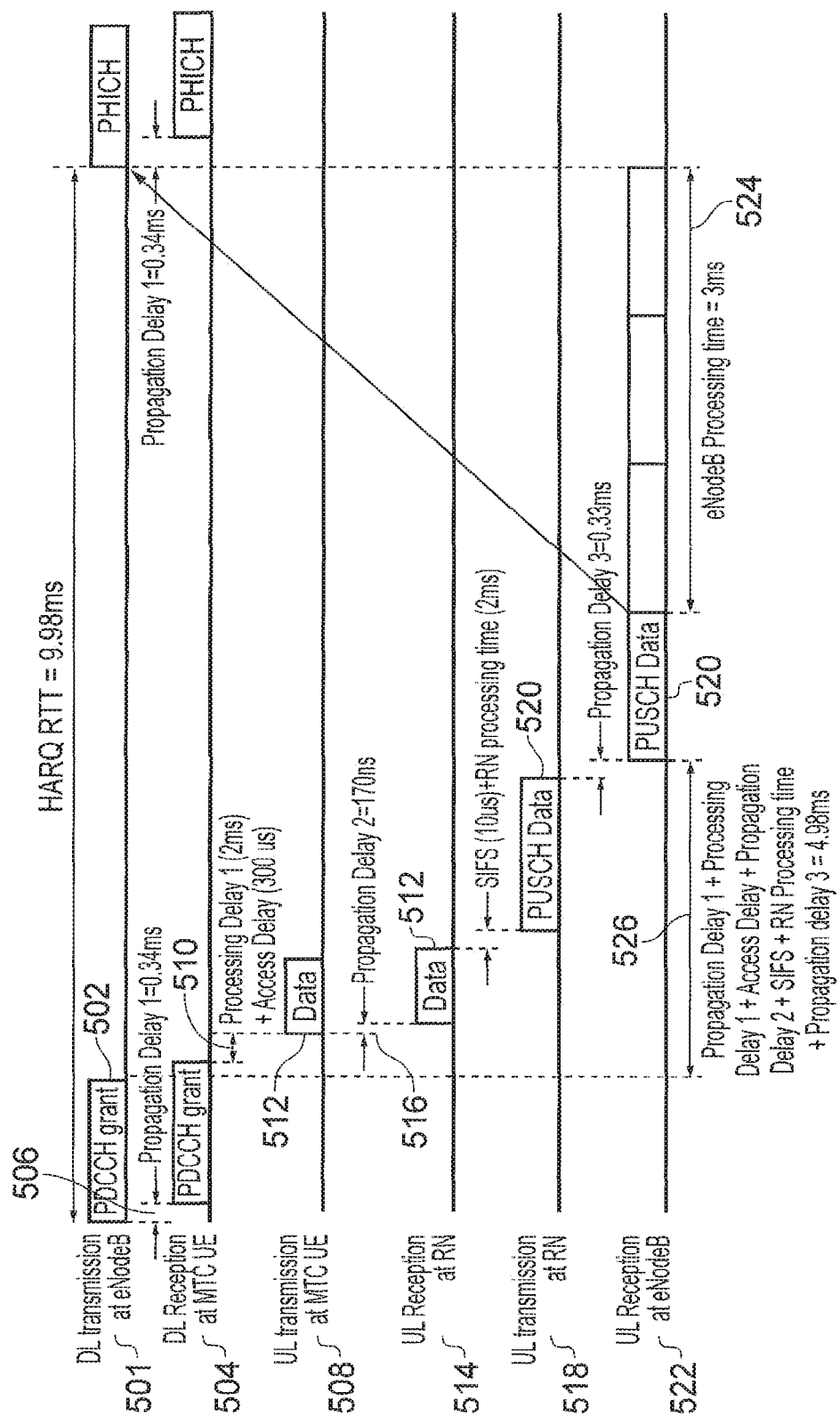
FIG. 5 Timing diagram of the uplink HARQ protocol in UL relay assisted case

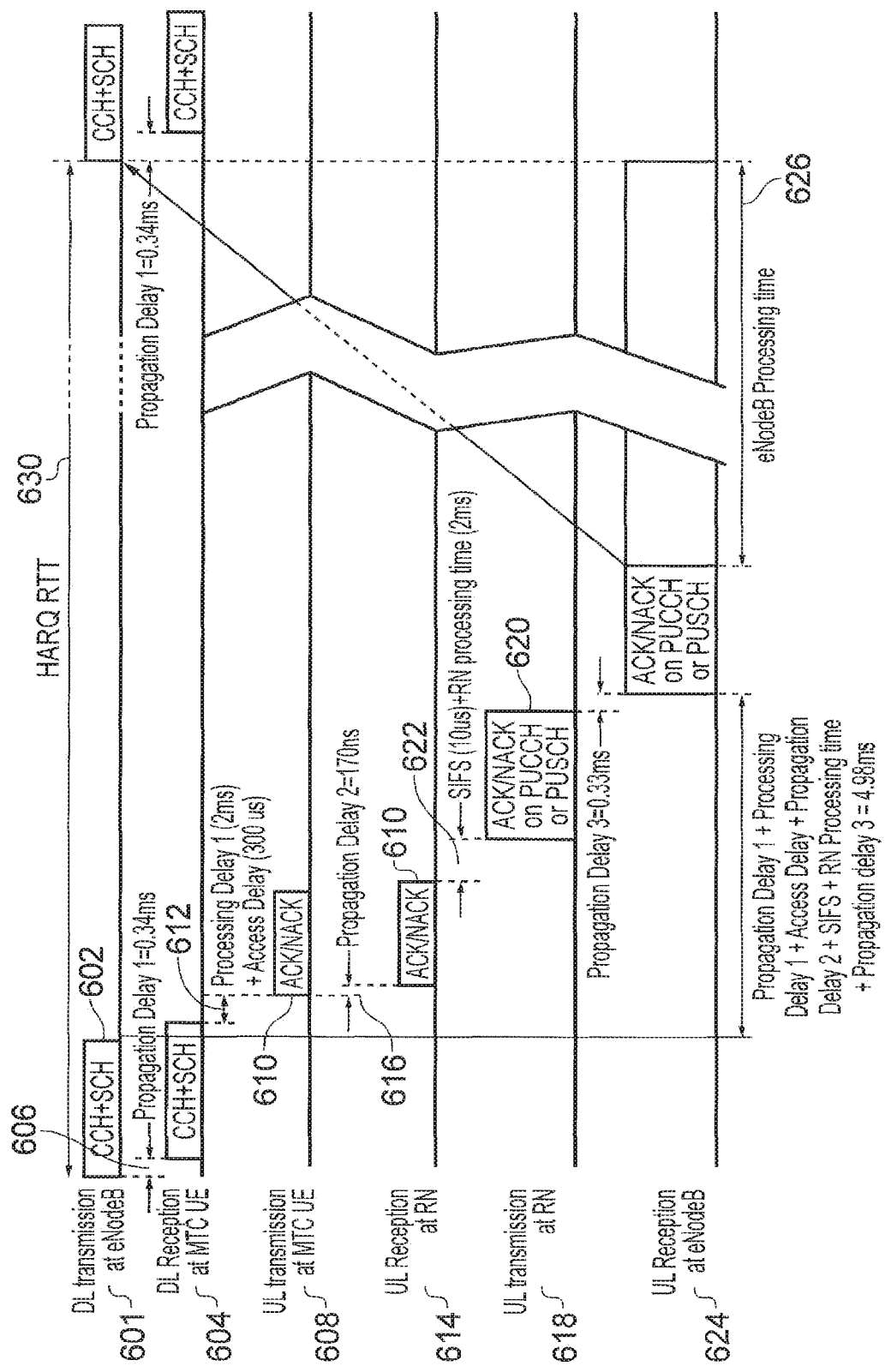
FIG. 6 Timing diagram of the downlink HARQ protocol in UL relay assisted case Timing diagram for determining UL delay from relaying Additional delay established by the eNodeB

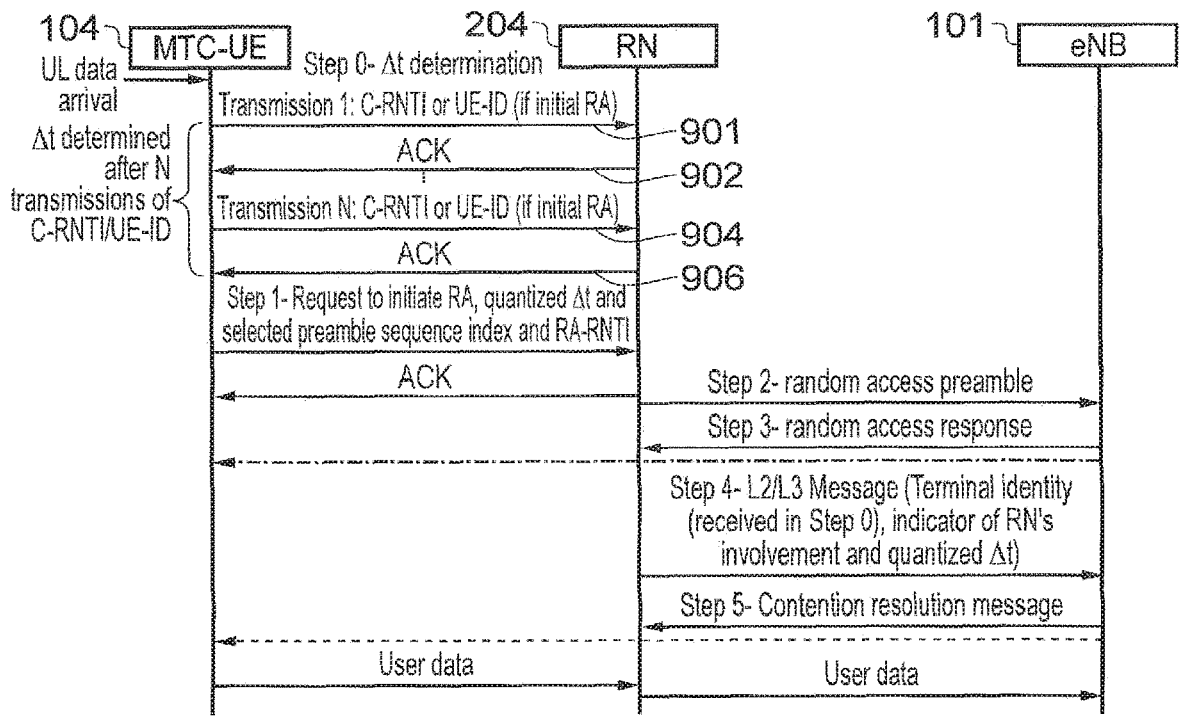
FIG. 9 Random Access procedure through RN (Solution 1)
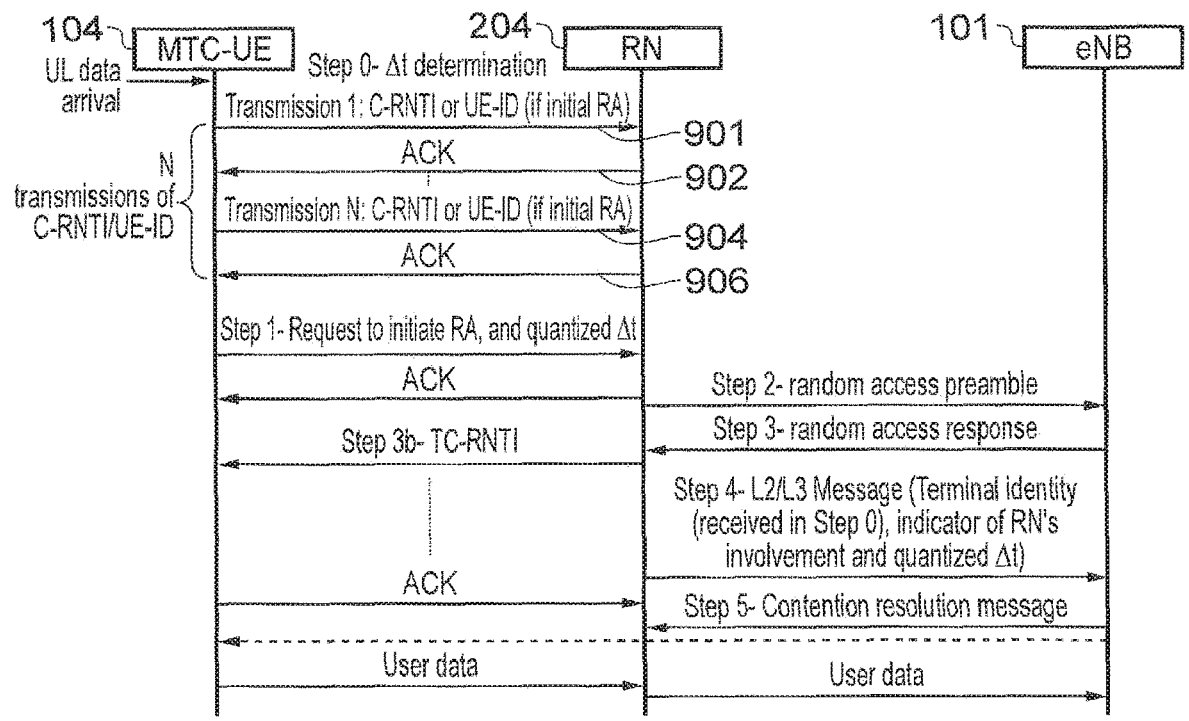
FIG. 10 Random Access procedure through RN (Solution 2)

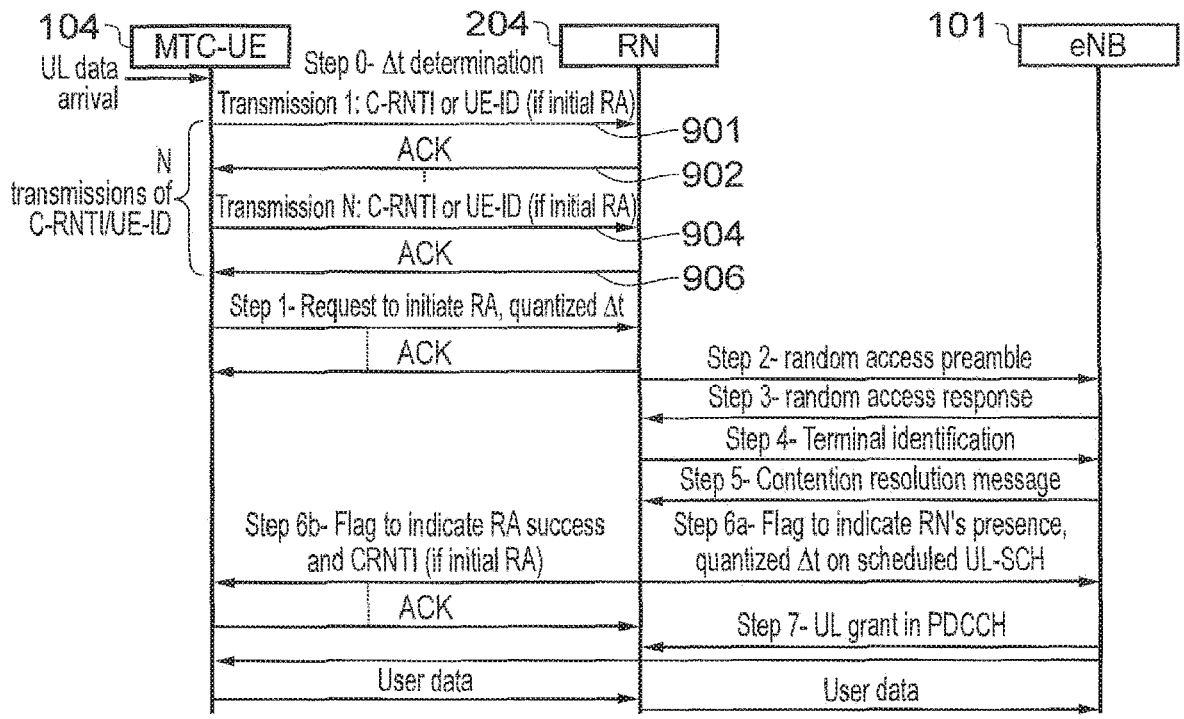
FIG. 11 Random Access procedure through RN (Solution 3)
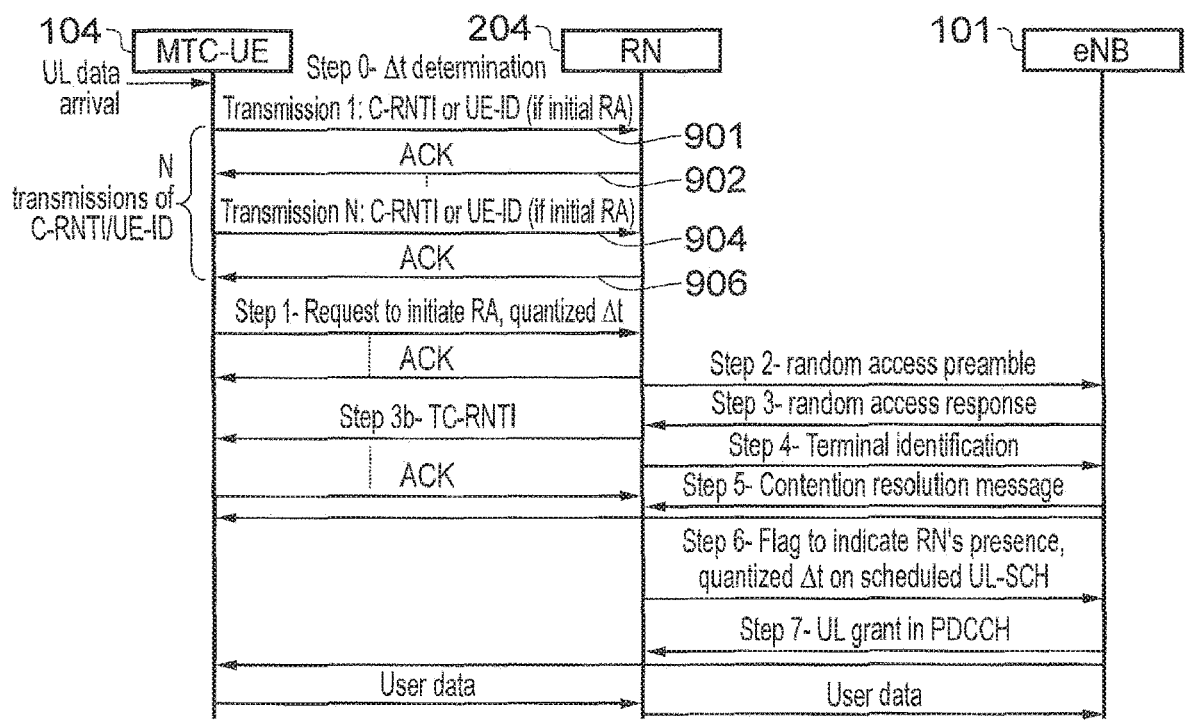
FIG. 12 Random Access procedure through RN (Solution 4)

COMMUNICATIONS DEVICE, COMMUNICATIONS APPARATUS OPERATING AS A RELAY NODE, INFRASTRUCTURE EQUIPMENT AND METHODS

CROSS-REFERENCE TO RELATED APPLICATIONS

This application is a continuation of U.S. application Ser. No. 15/311,666 filed Nov. 16, 2016, which is based on PCT filing PCT/EP2015/058423 filed Apr. 17, 2015, and claims priority to EP 14170122.7 filed on May 27, 2014, the entire contents of each are incorporated herein by reference.

TECHNICAL FIELD OF THE DISCLOSURE

The present disclosure relates to communications devices and methods for communicating data using communications devices, and also to communications apparatus which operate as relay nodes and methods for communicating via a relay node. The present disclosure also relates to infrastructure equipment which forms part of a mobile communications network and methods of communicating using infrastructure equipment.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include medical devices which are continuously or intermittently transmitting data such as for example measurements or readings from monitors via a communications network to a server, and automotive applications in which measurement data is gathered from sensors on a vehicle and transmitted via a mobile communications network to a server attached to the network.

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation communications device such as a smartphone, an MTC-type terminal is preferably relatively simple and inexpensive, having a reduced capability. In addition MTC-devices are often deployed in situations that do not afford easy access for direct maintenance or replacement, so that reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. Accordingly such devices may be low power or battery operated and therefore have a reduced transmission power capability compared with more conventional devices. Such MTC devices may also be deployed in remote locations where radio propagation conditions may be poor so that radio signals transmitted by the MTC device may be less likely to be receivable by a base station.

SUMMARY OF THE DISCLOSURE

According to an example embodiment of the present technique there is provided a communications device, the communications device comprising a transmitter configured to transmit signals representing data to an infrastructure equipment of a mobile communications network via a first wireless access interface, a receiver configured to receive signals from the infrastructure equipment of the mobile communications network via the first wireless access interface, and a controller for controlling the transmitter and the receiver. The controller may control the transmitter and the receiver to transmit data to the infrastructure equipment in accordance with a synchronous process in which a synchronized response is received from the infrastructure equipment, or to receive data from the infrastructure equipment in accordance with a synchronous process in which a synchronized response is transmitted to the infrastructure equipment. In one example the synchronous process may be an automatic repeat request (ARQ) type process. The controller is configured in combination with the transmitter and the receive to transmit signals via a second wireless access interface to a communications apparatus operating as a relay node, the signals being for transmission to the infrastructure equipment by the communications apparatus as if the signals were transmitted by the communications device via the first wireless communications interface, to receive signals from the infrastructure via the first wireless access interface, to determine an additional delay caused by the transmission of the signals to the communications apparatus acting as the relay node via the second wireless access interface compared with a time taken which would have been taken to transmit the signals to the infrastructure equipment as if transmitted via the first wireless access interface, and to transmit to the infrastructure equipment an indication from which the infrastructure equipment can derive the determined additional delay for adjusting the transmission of the reception of the acknowledgment or negative acknowledgements.

Embodiments of the present technique can provide an arrangement in which a communications apparatus forms an ad-hoc relay mode. Thus the communications apparatus may itself be a mobile communications device, smart phone or wireless router. The mobile device to relay node communication may therefore be a device-to-device communication as disclosed in our co-pending European patent applications 14153010.5, 14153540.1, 14157187.7, 14154396.7, 14161202.8, 14161201.0, 14161181.4, the contents of which are incorporated herein by reference.

According to the present technique a communications device, such as an MTC-UE which is configured to transmit and receive signals in accordance with a first wireless access interface, for example, an LTE wireless access interface, is arranged to transmit and receive signals with a communications apparatus, which operates as a relay node via a second wireless access interface because the relay node includes a transmitter and receiver which is configured to operate in accordance with the second wireless access interface such as, for example, WiFi. Accordingly, the communications devices can transmit signals to the relay node, for example, on the uplink via the second wireless access interface and the relay node can then operate in accordance with the LTE standard to transmit signals received from the UEs to a base station or eNodeB via the first wireless access interface operating in accordance, for example, with the LTE standard. However, in order to address a problem associated with an additional delay caused by the reception and re-transmission by the communications apparatus operating as a relay node, embodiments of the present technique provide an arrangement for determining the additional delay caused by the presence of the relay node, for example, for the uplink communications and then accommodating the presence of the delay in effecting communications which are synchronized between the base station and the communications devices. In one example, the synchronized communication may be a hybrid automatic repeat request (HARQ) or ARQ type process in which an acknowledgment/negative acknowledgement is required in response to the receipt of a transmission. This may be on the uplink or the down link because acknowledgments are required on both the uplink and the down link and therefore these acknowledgements/negative acknowledgements are synchronized with respect to the transmissions made by the communications devices.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which:

FIG. 3 provides example timing diagrams associated with an downlink hybrid automatic repeat request (HARQ) protocol;

FIG. 4 provides example timing diagrams associated with an uplink hybrid automatic repeat request (HARQ) protocol;

FIG. 5 provides example timing diagrams associated with an uplink transmission in accordance with a hybrid automatic repeat request (HARQ) protocol which is assisted with a relay node on the uplink;

FIG. 6 provides example timing diagrams associated with a downlink transmission in accordance with a hybrid automatic repeat request (HARQ) protocol which is assisted with a relay node on the uplink;

FIG. 9 provides example timing diagrams illustrating a random access procedure through a relay node according to a first example of the present technique;

FIG. 10 provides example timing diagrams illustrating a random access procedure through a relay node according to a second example of the present technique;

FIG. 11 provides example timing diagrams illustrating a random access procedure through a relay node according to a third example of the present technique; and FIG. 12 provides example timing diagrams illustrating a random access procedure through a relay node according to a fourth example of the present technique.

DESCRIPTION OF EXAMPLE EMBODIMENTS

Figure 1:
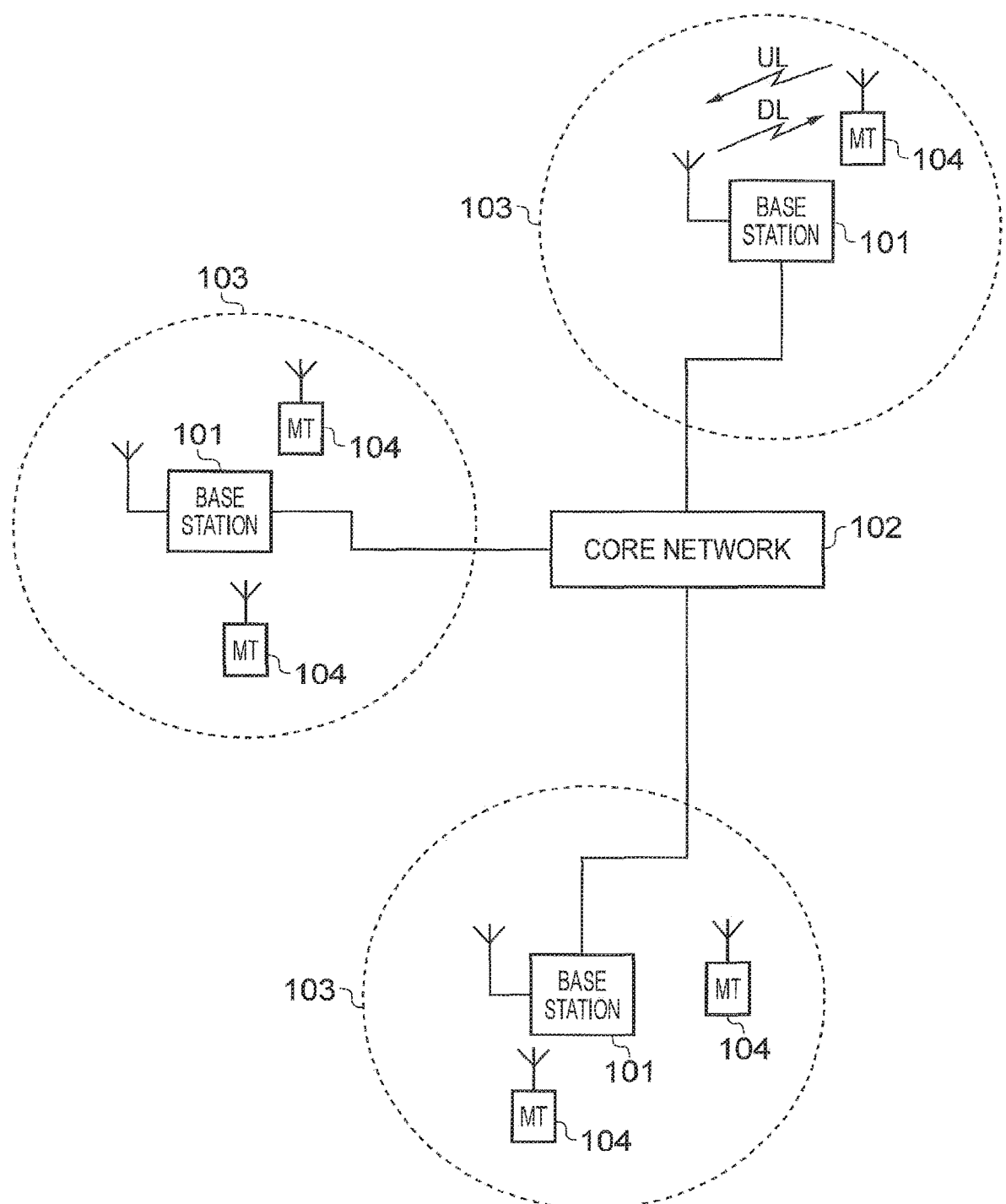
FIG. 1 provides a schematic diagram of a mobile communications system.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Example Communications System

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from communications devices (also referred to as mobile terminals, MT or User equipment, UE) 104. Data is transmitted from base stations 101 to communications devices 104 within their respective coverage areas 103 via a radio downlink Data is transmitted from communications devices 104 to the base stations 101 via a radio uplink. The core network 102 routes data to and from the communications devices 104 via the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNB and a small eNB. The small eNB may be an eNB such as a pico eNB, a micro eNB, and a home (femto) eNB that covers a cell smaller than a macro cell. Instead, the base station 200 may be realized as any other types of base stations such as a NodeB and a base transceiver station (BTS). The base station 200 may include a main body (that is also referred to as a base station apparatus) configured to control radio communication, and one or more remote radio heads (RRH) disposed in a different place from the main body. In addition, various types of terminals, which will be described below, may each operate as the base station 200 by temporarily or semi-persistently executing a base station function.

For example, any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 300 may be a radio communication module (such as an integrated circuit module including a single die) mounted on each of the terminals.

Relay Technologies

Relay technologies are known generally to provide an arrangement for receiving signals from a base station and for retransmitting the received signals to a UE in a mobile communications network, or to receive signals transmitted from a UE for re-transmission to a base station of a mobile communications network. As a result of such an arrangement a radio coverage area provided by an mobile communications network can be used to extend the In 3GPP, there are two main types of relays; Type-I and Type-II [10]. Type-I relay is a kind of non-transparent relay with wireless backhaul to the donor eNodeB cell. It has its own cell and physical cell identification (ID), terminates all layers 2 and 3 protocols and appears as a normal eNodeB to UE. Therefore the Type-I relay, which transmits synchronization signals and performs resource allocation, can help a remote UE that is out of normal coverage of eNodeB, thereby, extending the signal and service coverage. Type-I relay can operate in inband (eNodeB-relay node communication on same carrier frequency as relay node-UE) manner as well as outband (eNodeB-relay node on different carrier frequency to that of relay node-UE) manner. On the other hand Type-II relays do not have their own cell ID and the UE is not aware of whether or not it is communicating with the eNodeB via the relay node. Type-II relay nodes support only inband operation.

As explained above, it is desirable to extend the normal coverage of eNodeBs for machine type communications (MTC) UEs that are typically located in locations where they experience significant penetration losses. For example, electric and gas meters are often installed in locations where they suffer from poor network coverage, such as in the basements of residential buildings, beneath the staircase or even underground (below a manhole cover). To ensure MTC applications in such challenging locations, 3GPP initially identified the need for 20 dB improvement in coverage for low-cost MTC devices in comparison to defined LTE cell coverage footprint at the beginning of its study item [11], however finally settled on a lower value of 15 dB at the conclusion of the study item [20]. For MTC coverage extension, power spectral density (PSD) boosting has been studied extensively along with other approaches such as repetition coding [12]-[19] and it is noted that MTC UEs in extreme coverage scenarios might have characteristics such as very low data rate, greater delay tolerance and no mobility.

Figure 2:
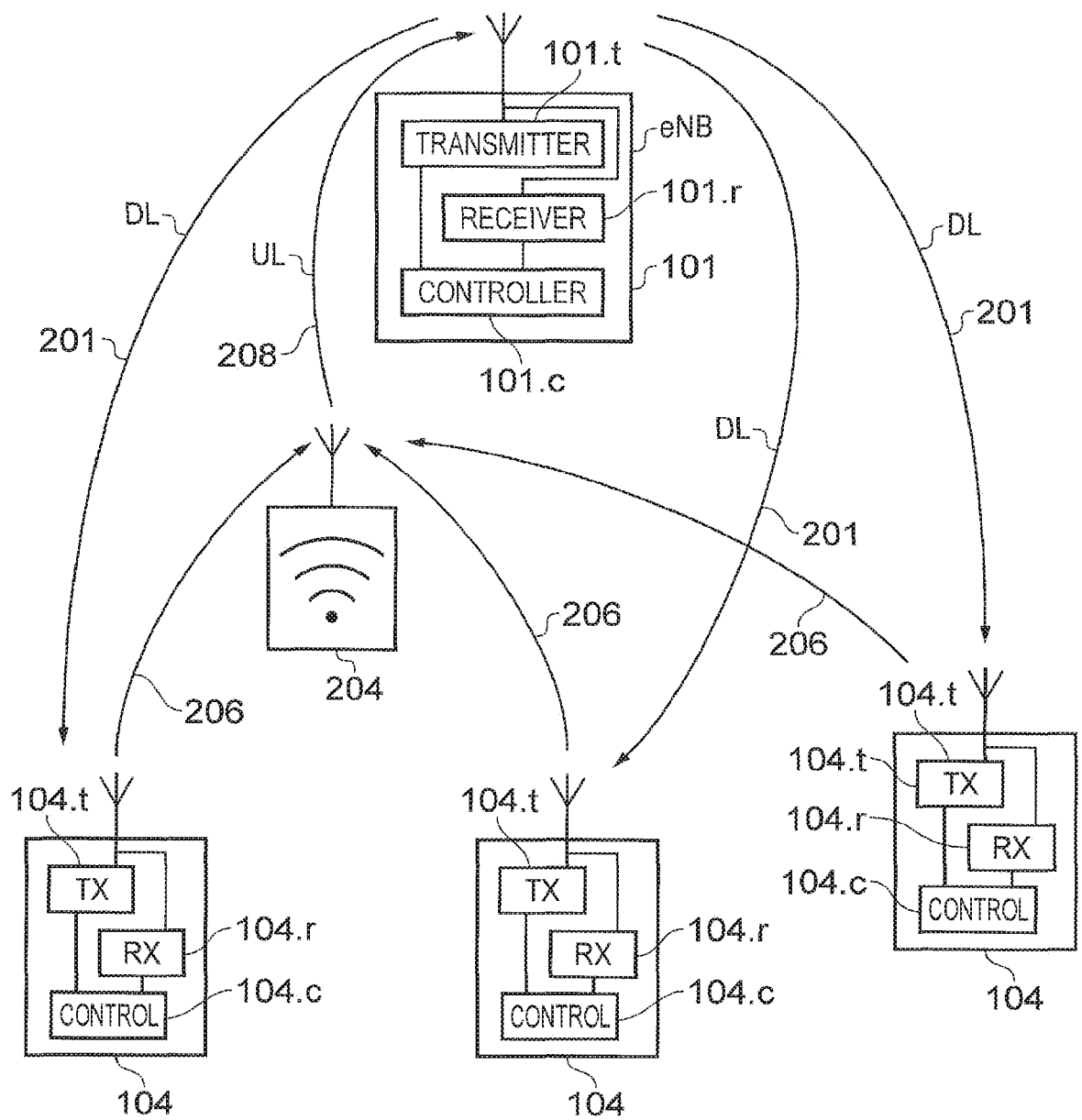
FIG. 2 provides a schematic diagram of a communications device (UE) communicating with a mobile communications network via a communications apparatus operating as a relay node.

FIG. 2 provides an example scenario in which a communications device forms an ad-hoc relay node to facilitate communication of radio signals to communications devices (UEs). In some examples the UEs may be MTC-UEs. As shown in FIG. 2 a base station or eNodeB 101 transmits downlink transmissions via an LTE-type wireless access interface to UEs 104 which as already mentioned may be MTC type UEs. The base station or eNodeB 101 includes a transmitter 101.*tx*, a receiver 101.*tx* and a controller or scheduler 101.*ct*. Correspondingly the UEs 104 includes a transmitter 104.*tx*, a receiver 104.*rx* and a controller 104.*ct*.

MTC type UEs may be disposed in a remote location such as a basement of a house or within a car and therefore radio transmission and reception from the UEs may be difficult. Furthermore, MTC-UEs themselves are likely to be low power devices and therefore, for example, may be battery powered. As such, the UEs 104 may be limited in their transmission power in addition to being disposed in a location, which makes radio communications difficult. However, the eNodeB 101 is not as limited in transmission power and therefore the downlink transmission signals 201 are likely to be receivable by the UEs 104 in situations in which up-link transmissions from the MTC-UE may not reach the eNodeB 101. Accordingly, a communications apparatus may operate as a relay node 204 to receive signals from the UE 104 and retransmit the signals from the relay node 204 to the base station 101 represented by an arrow 208.

According to the present technique, the communications apparatus 204 which forms a relay node may for example communicate with the MTC UEs using a WiFi for example (IEEE 802.11) or another type wireless access interface. However, the relay node 204 is also provided with a transmitter and receiver, which is able to operate in accordance with an LTE wireless access interface. Accordingly, signals transmitted by the UEs 104 can be received by the relay node 204 via the WiFi wireless access interface and retransmitted by the relay node 204 to the eNodeB 101 via the LTE uplink wireless access interface. Accordingly, the relay node 204 may operate as if the relay node were then a UE transmitting signals on the up-link in accordance with the LTE standard. As will be explained shortly in order to perform communications in accordance with the LTE standard, the UE and the eNodeB 204 must accommodate an additional delay in transmission caused by the presence of the relay node 204 in the up-link transmissions from the UE to the eNodeB.

For the example of an MTC UE is in the eNodeB coverage region and receives the downlink transmission directly from the eNodeB. However, in order to extend the uplink coverage whilst ensuring lower transmission power consumption, the UE establishes a Wi-Fi connection with a device within its communication range. This device, which acts as an relay node, assists uplink transmission to the eNodeB with or without power boosting.

The eNodeB sends data and control information in downlink shared channel (PDSCH) and control (PDCCH) channel, respectively, to the MTC UE. The MTC UE establishes Wi-Fi connection (Note: this could also be LTE connection in the unlicensed bands) with the relay node for transmitting the corresponding feedback (ACK/NACK) and data or other control information e.g., channel quality indicator (CQI), rank indicator (RI) and precoding matrix indicator (PMI) to the eNodeB.

In order to send data and/or control to the relay node on Wi-Fi access link, the MTC UE is required to gain access to the channel that may be shared among a number of other devices. The 802.11 (Wi-Fi) medium access control (MAC) supports shared access to the wireless medium through carrier sense multiple access with collision avoidance (CSMA/CA). With CSMA/CA technique, if the channel is sensed to be 'idle' for a fixed duration, the user waits a random period and is permitted to transmit if the channel remains idle at the end of this period. However if the channel is sensed to be 'busy', the transmission is deferred. This implies that the channel is not always available instantly when the MTC UE wishes to transmit data.

HARQ Process

The HARQ operation includes (re-)transmission and reception of transport blocks (TBs) at various redundancy levels, as well as generation and processing of acknowledgement/negative acknowledgment (ACK/NACK) signalling HARQ is an example of a synchronous or synchronized communications procedure, in which a synchronized response is received in response to a transmission by one of the UE or the eNodeB. In order to enable continuous transmission while previous transport blocks (TBs) are being decoded or ACK/NACK being awaited, the HARQ mechanism in the FDD mode of LTE supports multiple (up to eight) stop-and-wait (SAW) protocols, each operating on a single transport block. The downlink (DL) HARQ protocol is asynchronous and adaptive i.e., retransmissions may occur at any time and at an arbitrary frequency location within the downlink cell bandwidth. The UE is signalled the explicit HARQ process number (three bits for FDD, four bits for TDD) as part of the downlink scheduling assignment. On the other hand, synchronous HARQ is used for the uplink (UL) and the retransmissions may either be adaptive or non-adaptive, though non-adaptive retransmissions are typically used due to the very low overhead in terms of downlink control signalling. Asynchronous protocol is used in order to achieve lower signalling overhead; the HARQ process number is a priori known from the subframe number.

Considering the frequency division duplex (FDD) case, the detailed timing diagrams of downlink and uplink HARQ protocols in LTE are shown in FIG. 3 and FIG. 4, respectively.

As shown in FIG. 3 in a first timing diagram 301, a downlink transmission from an eNodeB is made providing the physical down-link control channel (PDCCH) and physical down-link shared channel (PDSCH) resources for transmitting data to the UE. Following a propagation delay 302, the PDSCH and PDCCH 302 is received at the UE as represented by a timing diagram 306. Following a relative timing advance 308 performed by the UE to account for the propagation delay the UE transmits an ACK/NACK on the PUCCH or PUSCH 309 in response to the data received from the PDCCH or PDSCH 302 as represented by a timing diagram 310. As represented by a timing diagram 312 ACK or NACK transmitted on the PDCCH or PDSCH is received at the eNodeB and after a processing delay 314 the eNodeB transmits the next PDCCH or PDSCH data which may be a re-transmission or the next data block which is to be transmitted. Thus the total round trip delay for the downlink HARQ process is represented by double headed arrow 316.

The corresponding process for an uplink HARQ is shown in FIG. 4. In FIG. 4, a first timing diagram 401 represents the transmission of a PDCCH grant message for an uplink transmission by the UE. The PDCCH grant message 402 is transmitted on the downlink from the eNodeB and as shown in a timing diagram 404 is received at the UE following a propagation delay 406. As shown by a timing diagram 408 in which a timing advance performed by the UE 410 advances the timing of transmission of the UE on the uplink, a PUSCH data is transmitted by the UE to the eNodeB 412. As shown in a timing diagram 414, the uplink reception at the eNodeB of the PUSCH data 412 is shown and after a further processing delay 416, the eNodeB may transmit a further data block or re-transmit the data block as represented by a further PDCCH or PHICH 420.

The timing relation between reception of data in the downlink direction and the transmission of the HARQ ACK/NACK in the uplink direction (and vice versa) is fixed in order to associate the ACK/NACK with a certain HARQ process. As shown in FIG. 4 for downlink HARQ, for data transmitted in physical downlink shared channel (PDSCH) in subframe n the corresponding ACK/NACK feedback is received at uplink subframe n+4. For uplink HARQ shown in FIG. 4, physical downlink control channel (PDCCH) at downlink subframe m is associated with the physical uplink shared channel (PUSCH) transmission at uplink subframe m−4, which is in turn associated with physical hybrid indicator channel (PHICH) at downlink subframe m+8.

The introduction of the Relay Node will introduce unknown channel access delays (if the relay node belongs to a different radio access technology RAT), and additional processing delay at the relay node would disrupt the downlink and uplink HARQ timelines in the relay transmission scheme.

FIG. 5 provides an example timing diagram illustrating an uplink HARQ protocol in which a relay node is operating to assist the uplink communication. A first line 501 represents a downlink transmission from the eNodeB granting access to uplink resources via a physical down-link control channel (PDCCH) grant message 502 according to the LTE standard. A time line 504 represents the timing of information received at the UE, which includes a propagation delay 506. A time line 508 for uplink transmission is also shown in which the data is transmitted after a processing delay 510 in which the data is transmitted as shown in a block 512. In a timing line 514 the uplink reception of the data 512 at the relay node is represented after a propagation delay 516. In a time line 518 the relay node transmits the data on granted resources of a shared channel resources as represented by a physical uplink shared channel (PUSCH) data block 520. A timing line 522 represents the uplink reception of the PUSCH data 522. Therefore as shown in timing line 522 the PUSCH data 520 is received and one or more other data blocks may also be transmitted. Thus, a total delay for the eNodeB to process the received PUSCH data 520 is represented by an arrow 524 following which an acknowledgment of the received data may be transmitted on the downlink on the eNodeB. A total time from the transmission of the PDCCH grant 502, which includes the propagation delay and processing delay as well as the access delay via the relay node is represented by an arrow 526.

As depicted in FIG. 5, the eNodeB sends the uplink grant signalling in the PDCCH to the MTC-UE. Since the LTE is designed to handle at least 100 km cell size and the corresponding round trip propagation delay is 0.67 ms [21], the maximum value of propagation delay for downlink transmission is 0.34 ms. The MTC UE processes this grant and encodes data in an 802.11 format frame structure for transmission to the relay node. This processing delay is 2 ms since 2.3 ms is the maximum time for terminal processing (decoding and encoding) in LTE. After a channel access delay of 0.3 ms i.e. incurred due to the Wi-Fi CSMA/CA MAC protocol, the data is transmitted to the relay node and received at the relay node after the propagation delay of 170 ns i.e. the maximum delay corresponding to the cell size of 50 m.

The processing at the relay node incurs a further delay of approximately 2 ms, the data is transmitted in the physical uplink shared channel (PUSCH) to the eNodeB which receives PUSCH after a propagation delay of approximately 0.33 ms. The eNodeB decodes PUSCH and sends the ACK/NACK signalling in the physical hybrid indicator channel (PHICH) after a processing delay of 3 ms. Therefore, taking into account all the delays incurred at various stages, the round trip time (RTT) for the uplink HARQ protocol in the proposed multi-RAT relay assisted uplink transmission scheme is approximately 10 ms. It is seen that for a grant sent by the eNodeB in subframe n, the corresponding data is received in the subframe n−6.

A timing diagram for the downlink HARQ protocol in the uplink relay assisted case is correspondingly shown in FIG. 6. A first timing diagram 601 represents the downlink transmission at the eNodeB of the control channel and shared channel resources within a block 602 which are received at the eNodeB as represented by a timing diagram 604. The shared channel grant message is received after a propagation delay 606. A further time line 608 represents the uplink transmission by the MTC UE of an ACK/NACK message to the eNodeB following the transmission on the downlink. The ACK/NACK message 610 is transmitted after a processing delay 612. A timing line 614 represents the timing of reception of the ACK/NACK at the relay node following a propagation delay 616.

A timing line 618 represents the uplink transmission of the relay node of the ACK/NACK on the PUCCH or PUSCH of the LTE wireless access interface 620 following a further propagation delay 622. A timing line 624 represents the uplink reception at the eNodeB of the ACK/NACK on the PUSCH or PUCCH of the LTE wireless access interface. Following a processing delay 626, the eNodeB can then transmit the data on the downlink control channel CCH or shared channel SCH for the next data block or re-transmission of the same data block to the UE following a repeat of the processes represented in the timing diagrams shown in FIG. 6. Thus a total HARQ round trip delay 630 is shown for a downlink HARQ protocol.

As illustrated by FIG. 6, the eNodeB transmits data in the physical downlink shared channel (PDSCH) and the control information in PDCCH to the MTC UE. Based on the similar reasoning as given earlier for timing diagram of the uplink HARQ protocol in the relay environment, the ACK/NACK signalling is received in the physical uplink control channel (PUCCH) or multiplexed with the data in PUSCH at the eNodeB after a delay of approximately 5 ms. Therefore it can be concluded that in the proposed relay-assisted transmission with Wi-Fi on the access link and LTE/LTE-A on the backhaul link, for data and/or control transmitted in subframe n from eNodeB, the corresponding control and/or data is received in subframe n+6.

In downlink HARQ process, the UE receives the transport block directly from the eNode B and will transmit ACK/NACK in subframe n+4. The receipt of this subframe will be delayed at the eNode B receiver due to potential uplink channel access delays and processing time in relay node. Due to the fact that the ACK/NACK response does not arrive at a priori known subframe, it is more difficult for the eNode B scheduler to decide which HARQ process it is related to. This becomes particularly difficult because the eNode B is performing three-state detection on PUCCH: ACK, NAK and DTX. If there is only DTX in the uplink subframe, the eNode B concludes that the UE has missed the initial transmission of systematic bits and would retransmit those bits instead of transmitting additional parity bits.

In uplink HARQ process, the uplink retransmissions of transport blocks in a priori known subframes become difficult due to the delayed ACK/NACK responses in downlink. This will break the synchronous process that avoids the need for using HARQ process numbers in uplink retransmissions. In order to retain the synchronous process, the uplink ACK/NACKs and retransmission can be envisioned to take place between the relay node (which buffers uplink transport blocks from the UE) and eNode B only. In this case the UE would have to know when the uplink transmission has completed successfully so it can send the next resource request to the eNode B, i.e. both the UE and relay node must understand the downlink control channel messages that are relevant to the particular UE-relay node-eNode B connection.

Uplink Scheduling

All uplink transmissions from a UE can only take place after a scheduling grant (SG) is received in PDCCH. Upon detection of a valid uplink SG, the UE will transmit its uplink-SCH according to the information included in the SG (transport format etc). The timing of the uplink transmission is similar to the HARQ process, i.e. an uplink grant in subframe n triggers an uplink transmission in subframe n+4. The access delays in UE-to-relay node radio link and processing delays at the relay node introduce the problem that the actual uplink-SCH transmitted by the relay node no longer is able to occupy the resources originally reserved in the uplink SG. In effect, the relay node would have to send a scheduling request of its own to access the uplink channel whereas the original SG to the UE ended up being a wasted uplink resource allocation.

Example Embodiments

Embodiments of the present technique can provide an arrangement in which a resource grant and HARQ processes are adapted to an additional delay introduced by multi-RAT relay assisted transmission in uplink. Once the data and control information, encapsulated e.g. in an 802.11 (a/b/g/n etc.) frame is received and decoded at the relay node, it is re-encoded following LTE/LTE-A specifications and transmitted to the eNodeB in the resources scheduled by the eNodeB for uplink transmission from the MTC UE.

It is assumed that the UE already knows which access point (over license-exempt spectrum) may act as the Relay Node towards the eNodeB from which the UE can receive downlink signal from. This may for example be information that the eNodeB provides in downlink system information to all the UEs camping there.

Determining the Additional Round-Trip Latency

Option 1: Estimating the Latency at eNodeB

According to a first example embodiment, a UE completes an initial access to the network via RACH and is then in an RRC Connected mode.

Figure 7:
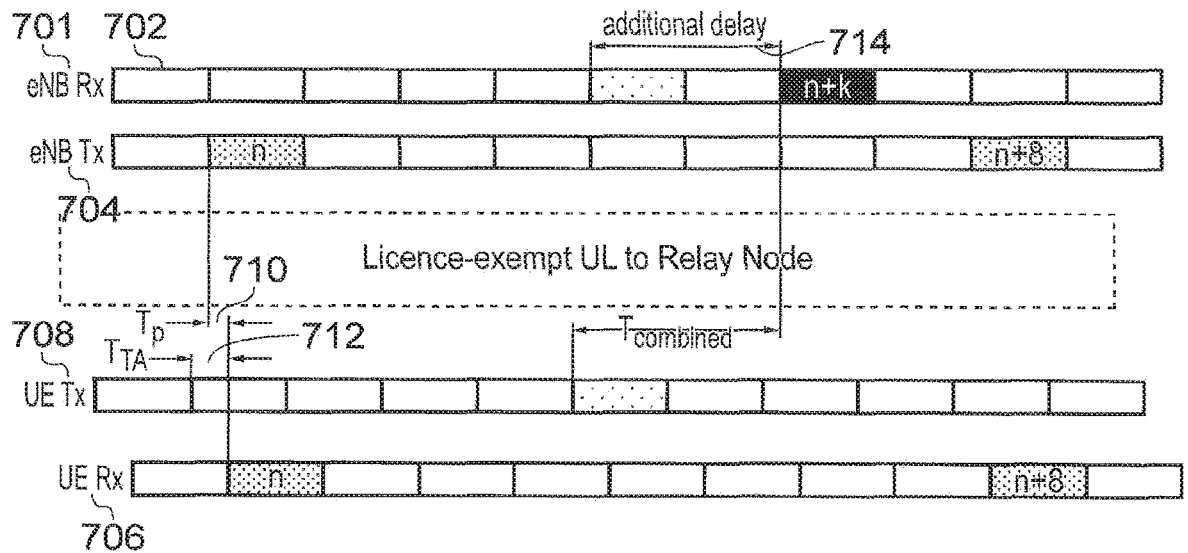
FIG. 7 provides example timing diagrams associated with determining uplink delay from relaying.

A simplified timing diagram showing the effects of the relay node on the uplink delay is shown in FIG. 7. A first timing diagram 701 shows a sequence of sub-frames 702 in which data is transmitted in accordance with the timing diagrams shown in FIGS. 5 and 6. A second diagram 704 shows the downlink transmissions by the eNodeB. Correspondingly, the down reception by the UE is shown in a timing diagram 706 and the uplink transmission by the UE is shown in timing diagram 708. As shown in FIG. 7, as a result of propagation delay TP 710, the UE receives the sub-frame N after the transmission time TP. The UEs transmission is advanced with respect to the reception in accordance with a timing advance period 712. However, as shown in FIG. 7 as a result of an additional delay 714, a reception by the eNodeB shown in timing diagram 701 is later then would otherwise be expected as a result of the presence of the relay node.

FIG. 7 depicts the delay introduced by the relaying process. The eNode B measures how much additional time the uplink relay assisted transmission introduces to the process timeline by sending a command to the UE in subframe n and determining when the reply is received at eNode B receiver. This can for example be done by issuing an uplink resource grant to the UE for providing its C-RNTI. The eNode B notes when (subframe n+k) it actually receives a message from the relay node containing this information and determines the additional delay from the expected subframe n+4. This process may be repeated a number of times to get more statistically reliable estimate of the delay caused by relaying. Consequently, whenever the eNode B assigns uplink resources to the UE, it gives resource grant to relay node for the eventual relay transmission in the new, delayed subframe.

Once the new RTT has been established, uplink resource grants, downlink and uplink HARQ processes adopt the new timing relation at eNode B, UE and relay node. The UE continues to be mandated to transmit uplink-SCH, ACK/NACK and retransmissions at n+4 subframes as it does based on current specifications. The eNode B appends the delay k to all the timings where it is expecting uplink transmissions at subframes n.

For the uplink resource grant, it may be most straightforward to assign it directly to the relay node for uplink subframe n+4+k, since it is the relay node that will actually transmit in the uplink resource.

Figure 8:
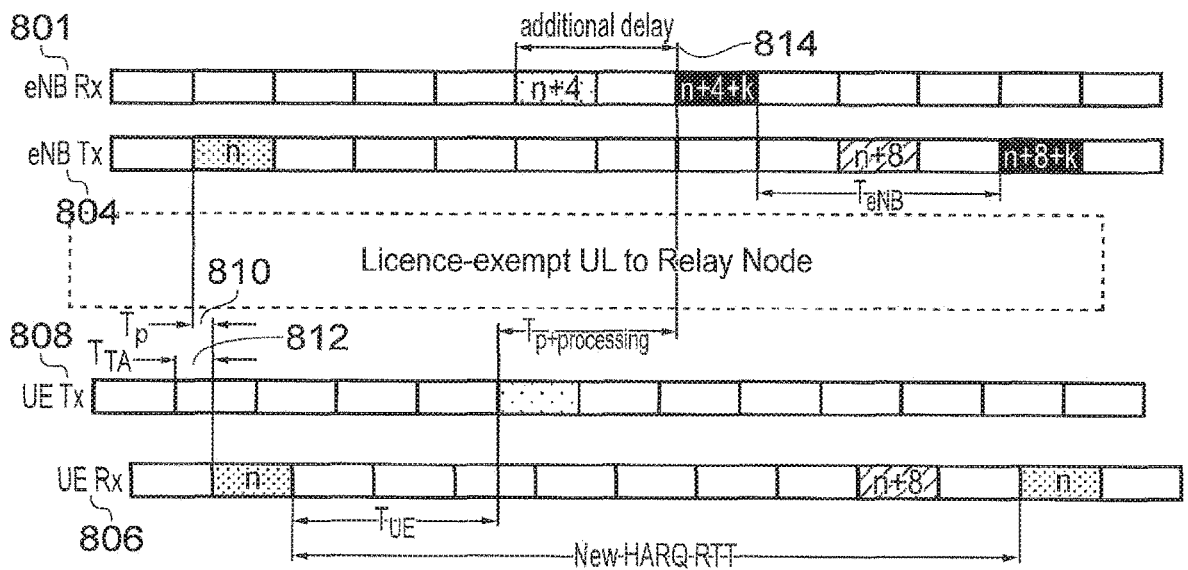
FIG. 8 provides example timing diagrams associated with establishing an additional delay caused by the relaying via a relay node at a base station (eNodeB)

FIG. 8 illustrates an arrangement in which the eNodeB establishes the additional delay shown in FIG. 7. As shown in FIG. 8 correspondingly an uplink reception timing diagram for reception at the eNodeB 801 illustrates the delay introduced 814 as a result of the relay node. Correspondingly, the downlink transmission eNodeB as represented by a timing diagram 804 is shown an uplink transmission and downlink reception diagrams 808, 806 shown for the UE.

In the downlink HARQ process, the eNode B is detecting which particular UE is sending feedback in a given subframe based on the UE specific orthogonal phase rotation of a cell-specific length-12 frequency domain sequence. According to the present technique, the relay node is arranged to link the correct phase shift to the UE that it is relaying in uplink.

Option 2: Estimating the Latency at the UE

It is assumed that the UE is already associated with the relay node. Whenever uplink data arrives at the UE, the access delay is determined by the UE and sent to the eNodeB during random access (RA) initiated by the relay node on behalf of the UE. Therefore, the UE does not necessarily have to be in RRC connected mode.

According to the present technique four different signalling exchange methods to estimate the latency between the UE and the relay node are described in the following description. The estimate of the additional delay is then transmitted to the eNodeB through the relay node whilst performing random access. These different signaling exchange methods are elaborated below, with reference to FIGS. 9, 10, 11 and 12.

The solutions combine two approaches, which in total make four different cases. One of the solutions provide the temporary identity assigned by the eNodeB directly to the UE and the relay node is more transparent in the process. Other solutions leave the assignment of the temporary ID to happen between the relay node and eNodeB, and only afterwards does the relay node provide the network identifier (ID) to the UE. On the other hand, two solutions leave the msg3 unchanged and use a new RRC message to indicate Δt to the eNodeB. The other two solutions modify the msg3 to carry information on Δt.

Solution 1: Random Access Procedure through Relay Node

FIG. 9 provides a call flow diagram showing a random access procedure through the relay node according to an example embodiment of the present technique. As shown in FIG. 9 a first step 0, the MTC UE 104 transmits the CRNTI or UEID to the relay node 204 as represented by an arrow 901. An acknowledgment is provided by the relay node by the message arrow 902 followed by a transmission of another CRNTI or UEIDs 904 as are required to transmit the data to the relay node 204.

The proposed random access procedure is shown in FIG. 9. When the UE has uplink data to transmit, it estimates the average access delay and then sends a request to the relay node to initiate a contention based random access as described below.

Step 0: The UE sends a packet carrying C-RNTI if the UE already has one (RRC_CONNECTED UE) or the unique UE identity to the relay node and waits for an ACK. Let $t_0$ be the time instant the UE initiates CSMA-CA to send the packet and $t_{ACK}$ be the instant an ACK is received from the relay node for the corresponding packet. The packet and the ACK are transmitted to and from the relay node via the WiFi interface. The UE determines the time elapsed between $t_0$ and $t_{ACK}$ to determine the access delay. This procedure is repeated N (pre-defined) times to obtain a statistically reliable estimate of the delay as $$\Delta t = \frac{1}{N}\sum_{n=1}^{N} \Delta t_n$$

where $\Delta t_n = t_{n,ACK} - t_{n,0}$ and the subscript n denotes $n^{th}$ trial. The average access delay, estimated at the end of step 0, is quantized into number of transmit time intervals (TTIs) by the UE.

Step 1: The UE sends a request to relay node to initiate random access. The bits to indicate quantized Δt are also transmitted in this message along with the preamble sequence index and Random Access Radio Network Temporary Identifier (RA-RNTI) that is identified by the UE taking into account the estimated access delay. The RA-RNTI is associated with the PRACH in which the Random Access preamble is transmitted through RA-RNTI=1+t_id+10*f_id Where t_id is the index of the first subframe of the specified PRACH (0≤t_id<10), and f_id is the index of the specified PRACH within that subframe, in ascending order of frequency domain (0≤f_id<6). (N.B. f_id is only applicable to TDD).

If the UE does not receive an ACK from the relay node within ACK time out, it will retransmit the above message until an ACK is received.

Step 2: Upon successful reception of the request sent by UE, the relay node will transmit the random access preamble (with embedded one bit of information to indicate the information related to the amount of transmission resource needed to transmit the message at Step 4) in the time-frequency slot identified by the information sent by the UE in Step 1.

Step 3: The random access response (RAR) message, addressed with RA-RNTI, sent by the eNodeB in Step 3 is decoded by both the UE and the relay node. It is a normal LTE RAR message, that is, it conveys the index of the detected preamble, the timing correction calculated by the RA preamble receiver, an uplink resource grant for the transmission of message in Step 4 and a temporary identity i.e. Temporary C-RNTI (TC-RNTI) (which may or may not be made permanent, in case of initial random access, for the UE after contention resolution). The UE decodes this message to obtain TC-RNTI useful for decoding the message in Step 5.

Step 4: If RAR message is successfully decoded, the relay node sends Layer 2/Layer 3 (L2/L3) message in Step 4 to the eNodeB using the uplink-SCH resources assigned in the RAR message in Step 3. This message in current specifications is msg3 (RRC Connection Request Message and MAC UE Contention Resolution ID control element). It contains the actual random access procedure message, such as RRC connection request or scheduling request, and includes TC-RNTI allocated in Step 3. Another important part of this uplink message is the inclusion of either the C-RNTI or the unique UE-ID (transmitted by the UE in Step 1) as a MAC control element in the uplink-SCH. In this solution it is also proposed to include quantized Δt and the information (a flag) about the presence of an relay node in this message. The eNodeB will adjust the HARQ time line in accordance with the access delay received in L2/L3 message received in Step 4.

Step 5: This is the last step in the proposed random access procedure and the normal LTE contention resolution message is transmitted on the downlink-SCH. Both the UE and the relay node receive and decode this message and the relay node compare the identity received in this message with the identity transmitted in the L2/L3 message in Step 4 by the relay node to eNodeB while the UE compares the received identity with the identity sent to the relay node by the UE in Step 0. If match is observed between these identities, the random access procedure is successful. If the UE has not yet been assigned a C-RNTI, the TC-RNTI from Step 3 is promoted to C-RNTI and the relay node also updates the identity of the UE to decode further scheduling grants sent to the UE in PDCCH.

After contention resolution in Step 5, the UE sends data to the relay node, over Wi-Fi link, which decodes and forwards it to the eNodeB over the LTE-A air interface.

Solution 2:

An overview of this solution is given in FIG. 10. The messages sent in different steps of this solution are similar to solution 1 and so the numbered steps are the same except as otherwise identified as follows:

Step 1: The UE only sends a request to relay node to initiate random access and the bits to indicate quantized Δt in this message.

The preamble sequence index is selected by the relay node in this solution.

Step 3: The RAR message in Step 3 is only decoded by the relay node since the RA-RNTI and preamble sequence index are not known to the UE.

Step 3b: The relay node sends a message containing TC-RNTI, received in the RAR message in Step 3, to the UE. The relay node will keep on retransmitting this message to the UE until an ACK is received, thus, indicating successful transmission of TC-RNTI to the UE. The UE will use this TC-RNTI to decode the message in Step 5.

If the relay node successfully receives the RAR message in Step 3, the minimum processing delay before L2/L3 message transmission in Step 4 is approximately 4 ms. Adding another 4 ms before the contention resolution message and uplink grant is received in Step 5, it is expected that the TC-RNTI will be successfully transmitted to and decoded at the UE, i.e. within approximately 8 ms, before message in Step 5 is received at the UE.

Solution 3:

FIG. 11 shows an overview of the solution wherein Step 0 and Step 1 are similar to Solution 2, and other steps are the same except as otherwise identified. The messages in Step 2 to Step 5 are similar to those transmitted in the normal random access procedure in the LTE-A.

After contention resolution in Step 5, the following additional steps are introduced in this solution.

Step 11.6a: The relay node sends a message to the eNodeB in the scheduled uplink-SCH. It includes the information to indicate the presence of relay node and the bits to indicate the channel access delay on the link between the UE and the relay node. This information will be used by the eNodeB to adjust the HARQ time lines for the UE addressed by C-RNTI.

Step 11.6b: After receiving and decoding the message in Step 5, the relay node sends a message to indicate successful random access procedure and also transmits C-RNTI to the UE (if it is initial random access). The message will be retransmitted until an ACK is received at the relay node.

Step 7: After decoding the message in Step 6a, the eNodeB will send an uplink grant in Step 7. This message will be decoded by the relay node as well as the UE which will in turn transmit the data to the relay node.

In order to ensure that the UE decodes the grant in Step 7, it is essential that message in Step 6b is successfully decoded by the UE within approximately 4 ms.

Solution 4:

This solution is quite similar to solution 3 as shown in FIG. 12. However, Step 12.3b is introduced in this solution and the relay node transmits TC-RNTI received in RAR message in Step 12.3 to the UE. This message will be retransmitted until an ACK is received. It is expected that the TC-RNTI will be successfully decoded at the UE before message in Step 12.5 is received (i.e. within 8 ms). This TC-RNTI will enable the UE to decode the message received in Step 12.5 and, hence, the message introduced in Step 12.6b in Solution 3 will not be required.

The UE does not send uplink data after Step 12.5. This message, received at UE, only serves to enable the UE promote the TC-RNTI to C-RNTI, if it is initial random access.

Message in Step 12.6 is similar to Step 12.6a as described in solution 3 and, as a result, the uplink grant is sent in Step 12.7 that is decoded by both the relay node and the UE.

HARQ Timeline Adjustment by eNodeB once Channel Access Delay is Known

The above described example solutions are based on the proposal that the UE can determine the channel access delay on the access link. Since different UEs will have different values of access delay, each UE will have different HARQ time line. Advantageously therefore, in order to avoid collisions and congestion the eNodeB will issue grants to different UEs at different times in order to avoid collision between uplink transmission from multiple UEs.

For a grant sent to $i^{th}$ UE in SF k, the data in uplink-SCH will be received in SF $k+4+\delta_i$ where $\delta_i$ is the offset in terms of TTIs for the $i^{th}$ user i.e. quantized $\Delta t_i$. In the absence of an relay node, $\delta_i$ will be zero.

Impact of Changing Latency between the UE and the Relay Node

Downlink HARQ Process

The timing relation that the UE and eNodeB have adopted for the HARQ process may change occasionally. For example, the license-exempt connection may have been suffering from interference when the UE estimated $\Delta t$, and later on the latency becomes smaller. The opposite may be true and the interference conditions make the latency longer than earlier measured $\Delta t$. In this case, the ACK/NACKs no longer arrive in the subframes that the receiver is expecting them, and the receiver will not be able to connect the acknowledgements to the correct HARQ process.

The changes in timing cause problems in the downlink HARQ process, since the eNodeB performs three-state detection, ACK, NACK or DTX, on uplink PUCCH. In the absence of ACK/NACK the eNodeB assumes that the original systematic bits were not received by the UE and it will transmit the systematic bits again (and not additional parity bits). The control signalling for transport blocks (TB) in downlink includes new data indicator, HARQ process number and the redundancy version, which are signalled in the scheduling assignment for each downlink transmission. Thus, the UE will be able to determine for the retransmission of systematic bits for the same HARQ process number that the eNodeB is not receiving ACK/NACK from it. This can act as a trigger for re-estimating the latency $\Delta t$.

Uplink HARQ Process

In the uplink HARQ process the HARQ process number is not explicitly signalled. The retransmissions would take place between the relay node and the eNodeB so the change in $\Delta t$ is not expected to cause problems in the uplink retransmission of a transport block. The impact is limited to the arrival of ACK/NACK to the UE from the eNodeB. Similarly to the downlink HARQ process, the acknowledgements are sent in a specific subframe timing after the receipt of a transport block. In the downlink the UE will find the ACK/NACK signal in the downlink HARQ indicator channel PHICH. The PHICH that the UE will expect the HARQ acknowledgement on is derived from the number of the first resource block upon which the corresponding transmission in PUSCH took place. The resources for the particular PHICH also depend on the reference signal phase rotation signalled in the uplink resource grant.

A change in the latency between the UE and the relay node will mean that the UE searches for the acknowledgement in a different subframe that it would actually be sent upon. This in effect means that the UE may read PHICH that was intended to another UE and another HARQ process. The relay node however may be configured to read correctly the relevant PHICH so the HARQ process in uplink will reach completion between the relay node and the eNodeB. The impact of misinterpreted PHICH is that the UE would not directly know when the transport block was finally successfully transmitted and the next one could be sent.

The uncertainty about variable latency can be avoided by managing all the uplink traffic between the Relay Node and eNodeB. Whenever the UE has transport blocks in its buffers it would transmit them to the relay node for further buffering and forwarding in uplink to the eNodeB.

Embodiments of the present technique can provide the following advantages:

Using relay node for uplink transmission would extend coverage of an MTC UE in a coverage hole, without requiring power boosting. In addition, less transmission power is required to communicate to the relay node due to a reduced path loss as compared to direct transmission to the eNodeB.

Using Wi-Fi on the access link for uplink transmission and then relaying to the eNodeB, instead of direct tunneling through the Internet, can avoid large and uncertain Internet delays, which is crucial for preserving a given HARQ timeline.

A key advantage of using license-exempt spectrum on the access link is that it provides outband relaying without cannibalizing other LTE spectrum resources. If this connection were using LTE inband relaying in the licensed bands, there would be interference issues to the other LTE users and eNodeBs. Outband relaying would use the operator's other LTE resources for access link with consequent capacity constraints.

Proposed HARQ method ensures privacy and trust for the MTC data. If two hop communication is allowed in an alternative manner (data from MTC UE to relay node in both uplink and downlink directions while relay node communicates in the both uplink and downlink directions with the eNodeB on behalf of MTC UE), any intermediate device can be brought in to hijack an MTC UE data. In another scenario, any node can act to be a relay sending malicious data to eNodeB on behalf of the MTC UE. In the proposed method, only a trusted relay node can assist in the uplink where main control is still with the eNodeB to authenticate and establish a connection.

A direct transmission from the eNodeB to the MTC UE can allow a Wi-Fi interface to be enabled only when required e.g. to provide feedback for a signal received from the eNodeB, thus conserving power. The MTC UE would only switch its Wi-Fi front-end circuitry on when advised to do so by the downlink commands from the eNodeB.

Since the eNodeB acts as the main node establishing and maintaining the overall link between the UE and itself, there is no need for the intermediate relay to be always switched on in the mode of an Access Point (AP) for the MTC UE. The link initiation is done over the downlink from the eNodeB to the MTC UE as well as the downlink between the eNodeB and the relay/AP. Hence the relay/AP is only alerted/switched ON in the mode to receive uplink data from the MTC UE when uplink data needs to be uploaded from the MTC UE to the eNodeB. This is especially useful in the eNodeB initiated communication.

Coverage extension can also be provided by Type-I relay nodes specified in Release 10 of the LTE. On the backhaul link, the relay node has to receive and transmit signals from and to donor eNodeB, while on the access link, an relay node has to transmit and receive signals to and from UEs. Some coordination or separation is necessary in order to avoid the transmitted signal of the relay node causing interference to its own receiver. No such separation is required in the proposed multi-RAT relaying scheme for MTC devices using different frequencies for the backhaul and access links (as the Access link is over WiFi). Since Wi-Fi operates over unlicensed spectrum, it also saves the expenses a network operator will have to bear, if indeed a second carrier frequency is available to use outband relay nodes (i.e. Type 1a relay nodes).

Use of Wi-Fi hotspots, that is an easy to install and low cost solution for offloading cellular data, can also be an effective solution in zones with poor coverage.

It should only be noted that choice of WiFi on the access link, i.e. from MTC UE to relay node is only one of possible solutions; there can also be other solutions, such as use of Zigbee, or even LTE over unlicensed bands, however the general principle of a new HARQ timelines remains same as illustrated the main idea of innovation, the exact value of the unknown access delay will need to be adjusted based upon the choice of RAT.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered clauses define various further aspects and features of the present technique:

1. A communications device, the communications device comprising
a transmitter configured to transmit signals representing data to an infrastructure equipment of a mobile communications network via a first wireless access interface,
a receiver configured to receive signals from the infrastructure equipment of the mobile communications network via the first wireless access interface, and
a controller for controlling the transmitter and the receiver
to transmit data to the infrastructure equipment in accordance with a synchronous process in which a synchronized response is received from the infrastructure equipment, or
to receive data from the infrastructure equipment in accordance with a synchronous process in which a synchronized response is transmitted to the infrastructure equipment, wherein the controller is configured in combination with the transmitter and the receive
to transmit signals via a second wireless access interface to a communications apparatus operating as a relay node, the signals being for transmission to the infrastructure equipment by the communications apparatus as if the signals were transmitted by the communications device via the first wireless communications interface,
to receive signals from the infrastructure via the first wireless access interface,
to determine an additional delay caused by the transmission of the signals to the communications apparatus acting as the relay node via the second wireless access interface compared with a time taken which would have been taken to transmit the signals to the infrastructure equipment as if transmitted via the first wireless access interface, and
to transmit to the infrastructure equipment an indication from which the infrastructure equipment can derive the determined additional delay for adjusting the transmission or reception of the synchronized response.

2. A communications device according to clause 1, wherein the controller in combination with the receiver and the transmitter are configured
to transmit a random access request message to the relay node, which includes the indication from which the infrastructure equipment can derive the determined additional delay with a signal indicating that the relay node should transmit the indication of the additional delay as a random access message.

3. A communications device according to clause 2, wherein the communications device is in a radio resource connected, RRC, idle state.

4. A communications device according to clause 1, wherein the controller in combination with the receiver and the transmitter are configured
to transmit a signal to the communications apparatus operating as the relay node via the second wireless access interface,
to receive an acknowledgement of receipt of the signal from the relay node via the second wireless access interface, and
to determine the additional delay for transmitting the data to the infrastructure equipment via the relay node from a time between transmitting the signals to the relay node and a time of receipt of the acknowledgement from the relay node via the second wireless access interface.

5. A communications device according to clause 4, wherein the signal transmitted to the relay node from the communications device represents the data for transmission to the infrastructure equipment.

6. A communications device according to clause 4 or 5, wherein the controller in combination with the receiver and the transmitter are configured
to transmit a random access request message to the relay node via the second wireless access interface, the random access request message providing an indication to initiate a random access procedure via the first wireless communications interface, the random access request message including the indication of the determined additional delay and an identifier of the communications device,
to receive a random access response message from the infrastructure equipment via the first wireless access interface, the random access response message including the identifier of the communications device transmitted in the random access request message, the random access response message being received by the communications device and the relay node, the relay node in response transmitting a radio resource connection request message, in resources allocated by the random access response message, which includes a temporary radio network temporary identifier and the additional delay for transmitting via the relay node, and
to receive a contention resolution message from the infrastructure equipment via the first wireless access interface, the contention resolution message including the unique identifier of the communications device transmitted to the relay node in the request message.

7. A communications device according to clause 4, wherein the controller in combination with the receiver and the transmitter are configured
to transmit a random access request message to the relay node via the second wireless access interface to initiate a random access procedure via the first wireless communications interface to transmit the data to the infrastructure equipment, the random access request message including the indication of the determined additional delay,
to receive a proxy response message from the relay node via the second wireless access interface, the proxy response message including a temporary radio network identifier of the communications device transmitted by the infrastructure equipment to the relay node via the first wireless access interface in response in the random access request message, and
to receive a contention resolution message from the infrastructure equipment via the first wireless access interface, the contention resolution message including the temporary radio network identifier of the communications device.

8. A communications device according to any of clauses 4 to 7, wherein the controller is configured to compare the identifier received in the contention resolution message with the identifier transmitted in the random access request message, and if the identifiers are the same, to transmit the data to the relay node for transmitting to the infrastructure equipment.

9. A communications device according to any of clauses 4 to 8, wherein the controller in combination with the receiver and the transmitter are configured to transmit data to the relay node using the temporary radio network identifier received from the infrastructure equipment via the first wireless access interface.

10. A communications device according to any of clauses 1 to 9, wherein the synchronous process is a hybrid automatic repeat request, HARQ, process, and the controller in combination with the receiver and the transmitter are configured to transmit data via the first wireless access interface by transmitting signals representing the data via an up-link channel of the first wireless access interface to the infrastructure equipment, and receiving the synchronized response comprising at least one acknowledgement or negative acknowledgement from the infrastructure equipment via a down-link channel of the first wireless interface at a time relating to the transmission of the data on the up-link channel, or to receive data from the infrastructure equipment by receiving signals representing the data from the infrastructure equipment on a down-link channel of the first wireless access interface and transmitting the synchronized response comprising at least one acknowledgement or negative acknowledgement to the infrastructure equipment via an up-link channel at a time relating to the reception of the data on the down-link.

REFERENCES

[1] Yang, Yang, et al. "Relay technologies for WiMAX and LTE-advanced mobile systems." *Communications Magazine, IEEE* 47.10 (2009): 100-105.
[2] Loa, Kanchei, et al. "IMT-advanced relay standards [WiMAX/LTE update]." *Communications Magazine, IEEE* 48.8 (2010): 40-48.
[3] 3GPP TR 36.814, "Further advancements for E-UTRA physical layer aspects," v9.0.0, 2010.
[4] R1-093355 (Alcatel-Lucent), "System design frameworks to support Type II relay operation in LTE-A," 2009.
[5] R1-093113 (Qualcomm Europe), "Challenges with Type II relay operation," 2009.
[6] R1-100951 (Alcatel-Lucent), "Type 2 relay summary," 2010.
[7] R1-100584 (Fujitsu), "Considerations on using Type 2 relay for UL transmission," 2010.
[8] Iwamura, Mikio, Hideaki Takahashi, and Satoshi Nagata. "Relay technology in LTE-Advanced." *NTT DoCoMo Technical Journal* 12.2 (2010): 29-36.
[9] Li, Anxin, et al. "A novel type II relay-assisted retransmission scheme for uplink of LTE-advanced system." *EURASIP Journal on Advances in Signal Processing* 2013.1 (2013): 1-9.
[10] S. Sesia et al. "LTE—The UMTS Long Term Evolution from Theory to Practice," 2nd ed. Chichester, United Kingdom: J. Wiley & Sons. Ltd., 2011.
[11] RP-121441 (Vodafone), "Updated SID on: Provision of low-cost MTC UEs based on LTE", TSG RAN meeting #57, Chicago, USA, 4-7 Sep. 2012.
[12] 3GPP TR 36.824, "LTE coverage enhancements," v11.0.0, June 2012.
[13] R1-124887 (Ericsson), "General consideration on coverage enhancements for MTC," November 2012.
[14] R1-125039 (Sony), "Coverage improvement techniques for low cost MTC UEs," November 2012.
[15] R1-130264 (LG), "Text proposal on coverage enhancement for a MTC UE," February 2013.
[16] R1-125204, "Coverage Extension for MTC UEs", RAN1 #71, General Dynamics Broadband UK.
[17] R1-130959 (Sony), "PDSCH coverage extension for low cost MTCs by power-density boosting," April 2013.
[18] R1-130960 (Sony), "PDCCH coverage extension for low cost MTCs by power-density boosting," April 2013.
[19] R1-130958 (Sony), "PBCH coverage extension for low cost MTCs by power-density boosting," April 2013.
[20] 3GPP TR 36.888, "Study on provision of low-cost machine communications user equipments based on LTE," v12.0.0, June 2013.
[21] E. Dahlman, S. Parkvall, J. Skold' "4G LTE/LTE-Advanced for Mobile Broadband".

The invention claimed is:

1. A communications device, the communications device comprising:

a transmitter configured to transmit signals representing data to an infrastructure equipment of a mobile communications network via a first wireless access interface, a receiver configured to receive signals from the infrastructure equipment of the mobile communications network via the first wireless access interface, and a controller configured to control the transmitter and the receiver to transmit data to the infrastructure equipment in accordance with a synchronous process in which a synchronized response is received from the infrastructure equipment, or receive data from the infrastructure equipment in accordance with a synchronous process in which a synchronized response is transmitted to the infrastructure equipment, wherein the controller is configured in combination with the transmitter and the receiver to transmit signals via a second wireless access interface to a communications apparatus operating as a relay node, the signals being for transmission to the infrastructure equipment by the communications apparatus as if the signals were transmitted by the communications device via the first wireless communications interface;

receive signals from the infrastructure via the first wireless access interface;

determine an additional delay caused by the transmission of the signals to the communications apparatus acting as the relay node via the second wireless access interface compared with a time taken which would have been taken to transmit the signals to the infrastructure equipment as if transmitted via the first wireless access interface; and transmit to the infrastructure equipment an indication from which the infrastructure equipment can derive the determined additional delay for adjusting the transmission or reception of the synchronized response.

2. The communications device as claimed in claim 1, wherein the controller in combination with the receiver and the transmitter are configured to transmit a random access request message to the relay node, which includes the indication from which the infrastructure equipment can derive the determined additional delay with a signal indicating that the relay node should transmit the indication of the additional delay as a random access message.

3. The communications device as claimed in claim 2, wherein
the communications device is in a radio resource connected (RRC), idle state.

4. The communications device as claimed in claim 1, wherein the controller in combination with the receiver and the transmitter are configured to:
transmit a signal to the communications apparatus operating as the relay node via the second wireless access interface;
receive an acknowledgement of receipt of the signal from the relay node via the second wireless access interface; and
determine the additional delay for transmitting the data to the infrastructure equipment via the relay node from a time between transmitting the signals to the relay node and a time of receipt of the acknowledgement from the relay node via the second wireless access interface.

5. The communications device as claimed in claim 4, wherein
the signal transmitted to the relay node from the communications device represents the data for transmission to the infrastructure equipment.

6. The communications device as claimed in claim 4, wherein the controller in combination with the receiver and the transmitter are configured to:
transmit a random access request message to the relay node via the second wireless access interface, the random access request message providing an indication to initiate a random access procedure via the first wireless communications interface, the random access request message including the indication of the determined additional delay and an identifier of the communications device;
receive a random access response message from the infrastructure equipment via the first wireless access interface, the random access response message including the identifier of the communications device transmitted in the random access request message, the random access response message being received by the communications device and the relay node, the relay node in response transmitting a radio resource connection request message, in resources allocated by the random access response message, which includes a temporary radio network temporary identifier and the additional delay for transmitting via the relay node; and
receive a contention resolution message from the infrastructure equipment via the first wireless access interface, the contention resolution message including the unique identifier of the communications device transmitted to the relay node in the request message.

7. The communications device as claimed in claim 4, wherein the controller in combination with the receiver and the transmitter are configured to:
transmit a random access request message to the relay node via the second wireless access interface to initiate a random access procedure via the first wireless communications interface to transmit the data to the infrastructure equipment, the random access request message including the indication of the determined additional delay;

receive a proxy response message from the relay node via the second wireless access interface, the proxy response message including a temporary radio network identifier of the communications device transmitted by the infrastructure equipment to the relay node via the first wireless access interface in response in the random access request message; and
receive a contention resolution message from the infrastructure equipment via the first wireless access interface, the contention resolution message including the temporary radio network identifier of the communications device.

8. The communications device as claimed in claim 4, wherein
the controller is configured to compare the identifier received in the contention resolution message with the identifier transmitted in the random access request message, and if the identifiers are the same, to transmit the data to the relay node for transmitting to the infrastructure equipment.

9. A communications device as claimed in claim 4, wherein
the controller in combination with the receiver and the transmitter are configured to transmit data to the relay node using the temporary radio network identifier received from the infrastructure equipment via the first wireless access interface.

10. The communications device as claimed in claim 1, wherein
the synchronous process is a hybrid automatic repeat request (HARQ) process, and
the controller in combination with the receiver and the transmitter are configured to
transmit data via the first wireless access interface by transmitting signals representing the data via an up-link channel of the first wireless access interface to the infrastructure equipment, and receiving the synchronized response comprising at least one acknowledgement or negative acknowledgement from the infrastructure equipment via a down-link channel of the first wireless interface at a time relating to the transmission of the data on the up-link channel, or
receive data from the infrastructure equipment by receiving signals representing the data from the infrastructure equipment on a down-link channel of the first wireless access interface and transmitting the synchronized response comprising at least one acknowledgement or negative acknowledgement to the infrastructure equipment via an up-link channel at a time relating to the reception of the data on the down-link.

11. An infrastructure equipment for forming part of a mobile communications network for transmitting data to communications devices or receiving data from communications devices, the infrastructure equipment comprising:
a transmitter configured to transmit signals representing data to the communications devices via a first wireless access interface;
a receiver configured to receive signals from the communications devices via the first wireless access interface; and
a controller for controlling the transmitter and the receiver to
transmit data to a communications device in accordance with a synchronous process in which a synchronized response is received from the communications device via an up-link channel of the first wireless interface at a time relating to the transmission of the data on a down-link channel, or to receive data from a communications device in accordance with a synchronous process in which a synchronized response is transmitted to the communications device via a down-link channel at a time relating to the reception of the data on an up-link, wherein the infrastructure equipment is configured to determine an additional delay between signals transmitted to the infrastructure equipment from the communications device via a communications apparatus acting as a relay node compared with a time taken to transmit signals from the communications device to the infrastructure equipment as if transmitted via the first wireless access interface; and to adjust the time relating to the transmission or reception of a synchronized response to the reception of data from the communications device or the transmission of data to the communications device.

12. The infrastructure equipment as claimed in claim 11, wherein the controller combination with the receiver and the transmitter are configured to:

transmit a resource grant message to the communications device allocating resources of the up-link of the first wireless access interface for the communications device to transmit a radio network temporary identifier to the infrastructure equipment;

receive the radio network temporary identifier from the communications apparatus operating as the relay mode via the up-link resources of the first wireless access interface granted by the resource grant message; and determine the additional delay from a time of receipt of the radio network temporary identifier from the relay node compared with a time which the radio network temporary identifier would have been received is received from the communications device via the first wireless access interface.

13. A method of communicating using a communications apparatus as a relay node, the method comprising:

transmitting signals to an infrastructure equipment of a mobile communications network via a first wireless access interface;

receiving signals from the infrastructure equipment of the mobile communications network via the first wireless access interface;

receiving signals from a communications device via a second wireless access interface, the signals being transmitted by the communications device for transmission to the infrastructure equipment and representing a communication via the first wireless communications interface; and transmitting signals via the first wireless access interface to the infrastructure equipment as if the signals were transmitted by the communications device, wherein the receiving the signals from the communications device includes receiving from the communications device via the second wireless access interface an indication of a determined additional delay for the communications device to transmit signals to the infrastructure equipment via the communications apparatus operating as the relay node; and transmitting the determined additional delay to the infrastructure equipment via the first wireless access interface, the additional delay being used by the infrastructure equipment for adjusting the transmission or reception of a synchronized response to the reception of data from the communications device or the transmission of data to the communications device.

14. The method as claimed in claim 13, wherein the receiving the signals from the communications device includes receiving a random access request message from the communications device via the second wireless access interface, the random access request message providing an indication to initiate a random access procedure via the first wireless communications interface, the random access request message including the indication of a determined additional delay for the communications device to transmit signals to the infrastructure equipment via the communications apparatus operating as a relay node and an identifier of the communications device, and the transmitting the determined additional delay to the infrastructure equipment via the first wireless access interface comprises transmitting a random access message to the infrastructure equipment via the first wireless access interface, the random access message including the identifier of the communications device;

receiving a random access response message from the infrastructure equipment via the first wireless access interface, the random access response message including the identifier of the communications device transmitted in the random access request message, resources allocated for transmitting on an up-link of the first wireless access interface and a temporary radio network temporary identifier for the communications device;

transmitting, in response, a radio resource connection request message, in the resources allocated by the random access response message, which includes the temporary radio network identifier and the additional delay for transmitting via the relay node; and receiving a contention resolution message from the infrastructure equipment via the first wireless access interface, the contention resolution message including the temporary radio network identifier of the communications device.

* * * * *